US006767048B2

(12) United States Patent
Yokota

(10) Patent No.: US 6,767,048 B2
(45) Date of Patent: Jul. 27, 2004

(54) AUTOMATIC DOOR OPERATING DEVICE

(75) Inventor: Yoshiaki Yokota, Yokohama (JP)

(73) Assignee: Ohi Seisakusho Co., Ltd., Kanagawa (JP)

( * ) Notice: Subject to any disclaimer, the term of this patent is extended or adjusted under 35 U.S.C. 154(b) by 0 days.

(21) Appl. No.: 10/418,166

(22) Filed: Apr. 18, 2003

(65) Prior Publication Data

US 2003/0196382 A1 Oct. 23, 2003

(30) Foreign Application Priority Data

Apr. 19, 2002 (JP) ....................................... 2002-117561
Apr. 19, 2002 (JP) ....................................... 2002-118366

(51) Int. Cl.[7] ............................... B60J 5/10; B60P 1/26

(52) U.S. Cl. ............................... 296/146.4; 296/146.8; 296/56

(58) Field of Search ........................... 296/146.1, 146.4, 296/147, 146.8, 146.9, 146.11, 20, 203.04, 50, 56, 193.05, 193.06, 193.08

(56) References Cited

U.S. PATENT DOCUMENTS 6,055,775 A 5/2000 Dering et al.
6,137,249 A * 10/2000 Butler et al. ................ 318/266
6,142,551 A 11/2000 Ciavaglia
6,270,147 B1 * 8/2001 Butler et al. ............. 296/146.4
6,298,604 B1 10/2001 Rogers, Jr. et al.
6,367,199 B2 * 4/2002 Sedlak et al. ................. 49/340
6,378,392 B1 * 4/2002 Dombrowski et al. ......... 74/422
6,382,706 B2 * 5/2002 Yuge et al. .............. 296/146.4
6,425,205 B2 * 7/2002 Wygle et al. ................. 49/349
6,453,614 B1 * 9/2002 Rogers et al. ................ 49/340
6,513,859 B2 * 2/2003 Yuge ....................... 296/146.4
6,550,839 B2 * 4/2003 Rogers et al. ................ 296/56
6,669,268 B2 * 12/2003 Oberheide ............... 296/146.8
6,676,190 B2 * 1/2004 Daniels et al. .............. 296/106
2001/0030441 A1 10/2001 Rogers et al.
2003/0146644 A1 * 8/2003 Sakai et al. .............. 296/146.8

FOREIGN PATENT DOCUMENTS

JP 2001-253241 9/2001
WO WO 01/83924 A1 11/2001

* cited by examiner

*Primary Examiner*—D. Glenn Dayoan
*Assistant Examiner*—H. Gutman
(74) *Attorney, Agent, or Firm*—Sughrue Mion, PLLC

(57) ABSTRACT

For pivotally connecting an upper end of a rack bar and a lower end of a connecting rod, there is employed a joint/slider unit which is slid in and along a guide slot of a rail member. The unit comprises a bolt member passing through the guide slot and including first and second sections which are respectively projected into one and the other sides with respect to the rail member. The first section is held by the upper end of the rack bar and the second section is pivotally held by the lower end of the connecting rod. A first slider is disposed on the first section of the bolt member and slidably contacts one surface of the rail member. A second slider is disposed on the second section of the bolt member and slidably contacts the other surface of the rail member. A universal joint structure is disposed between the second slider and lower end of the connecting rod to permit a pivoting of the connecting rod relative to the bolt member in universal directions.

11 Claims, 11 Drawing Sheets

AUTOMATIC DOOR OPERATING DEVICE

BACKGROUND OF INVENTION

1. Field of Invention

The present invention relates in general to automatic door operating devices and more particularly to the door operating devices of a type that is suitable for automatically opening and closing a back door that is pivotally connected to the open back of a wheeled motor vehicle.

2. Description of the Related Art

Hitherto, various types of automatic door operating devices have been proposed and put into practical use particularly in the field of the wheeled motor vehicles. One of such devices is shown in Laid-open Japanese Patent Application (Tokkai) 2001-253241.

The door operating device of this publication comprises two substantially same units, each including an electric motor mounted to the vehicle body, a pinion gear driven by the motor, a rack bar meshed with the pinion gear, a rail member extending upward from the motor to appropriately guide a movement of an upper part of the rack bar, and a connecting rod having one end pivotally connected to the upper part of the rack bar and the other end pivotally connected to a pivotal back door of the vehicle. Thus, upon energization of the motor, the rack bar is moved upward or downward thereby pivoting the back door in an opening or closing direction through the connecting rod.

In the door operating device of the publication, the pivotal connection between the rack bar and the connecting rod is made through a so-called "ball-socket type" joint structure which includes a ball that is possessed by the rack bar and a socket that is possessed by the connecting rod and universally slidably holds the ball.

SUMMARY OF THE INVENTION

However, due to the nature of the ball-socket type joint structure, the applicants have found a possibility of "out of joint" of the structure especially when an abnormally big force is suddenly applied to the structure from the back door in a direction to pull the ball and the socket apart.

Accordingly, an object of the present invention is to provide an automatic door operating device which is free of the above-mentioned drawback.

That is, it is an object of the present invention to provide an automatic door operating device which assures a durable pivotal connection between the rack bar and the connecting rod, which can keep their pivotal connection even when an abnormally big force is applied to them from the back door.

According to a first aspect of the present invention, there is provided an automatic door operating device for a motor vehicle that has a door pivotally connected to a body of the vehicle, the device comprising a drive unit mounted to the vehicle body and including an electric motor and a pinion gear driven by the electric motor; a rack bar meshed with the pinion gear; a rail member mounted to the vehicle body, the rail member having a longitudinally extending guide slot formed therethrough; a connecting rod having one end pivotally connected to the door; and a joint/slider unit that pivotally connects an end of the rack bar to the other end of the connecting rod while being slid in and along the guide slot of the rail member, wherein the joint/slider unit includes a bolt member passing through the guide slot and including first and second sections which are respectively projected into one and the other sides with respect to the rail member, the first section being held by the end of the rack bar and the second section being pivotally held by the other end of the connecting rod; a first slider disposed on the first section of the bolt member and slidably contacting one surface of the rail member; a second slider disposed on the second section of the bolt member and slidably contacting the other surface of the rail member; and a universal joint structure disposed between the second slider and the other end of the connecting rod to permit a pivoting of the connecting rod relative to the bolt member in universal directions.

According to a second aspect of the present invention, there is provided an automatic door operating device for a motor vehicle that has a door pivotally connected to a body of the vehicle, the device comprising a drive unit mounted to the vehicle body and including an electric motor and a pinion gear driven by the electric motor; a rack bar meshed with the pinion gear and having upper and lower ends; a rail member mounted to the vehicle body, the rail member having a longitudinally extending guide slot formed therethrough and elongate flanges between which the guide slot is defined; a connecting rod having an upper end pivotally connected to the door; a bolt member passing through the guide slot of the rail member and including first and second sections which are respectively projected into one and the other sides with respect to the rail member, the first section being held by the upper end of the rack bar and the second section being pivotally held by a lower end of the connecting rod; a first slider disposed on the first section of the bolt member and slidably contacting one surface of the rail member; a second slider disposed on the second section of the bolt member and slidably contacting the other surface of the rail member and inner surfaces of the elongate flanges of the rail member; a rod holder disposed in an opening formed in the lower end of the connecting rod; a concave portion possessed by the rod holder; and a convex portion possessed by the second slider and intimately and slidably engaged with the concave portion.

According to a third aspect of the present invention, there is provided an automatic door operating device for a motor vehicle that has a door pivotally connected to a body of the vehicle, the device comprising a drive unit mounted to the vehicle body and including an electric motor and a pinion gear driven by the electric motor; a rack bar meshed with the pinion gear and having upper and lower ends which are angled to each other by a given degree; a rail member mounted to the vehicle body, the rail member having a longitudinally extending guide slot formed therethrough and elongate flanges between which the guide slot is defined, the rail member being bent by a given angle at a generally middle portion thereof; a connecting rod having an upper end pivotally connected to the door; a bolt member passing through the guide slot of the rail member and including first and second sections which are respectively projected into one and the other sides with respect to the rail member, the first section being held by the upper end of the rack bar and the second section being pivotally held by a lower end of the connecting rod; a first slider disposed on the first section of the bolt member and slidably contacting one surface of the rail member; a second slider disposed on the second section of the bolt member and slidably contacting the other surface of the rail member and inner surfaces of the elongate flanges of the rail member; a rod holder disposed in an opening formed in the lower end of the connecting rod; a concave portion possessed by the rod holder; and a convex portion possessed by the second slider and intimately and slidably engaged with the concave portion.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, two, viz., first and second embodiments 100 and 200 of the present invention will be described in detail with reference to the accompanying drawings.

For ease of understanding, various directional terms, such as, right, left, upper, lower, rightward and the like are used in the following description. However, such terms are to be understood with respect to only drawing or drawings on which a corresponding part or portion is shown.

Furthermore, FIGS. 1, 2, 7 and 8 are drawings which are simply and briefly illustrated in order to clearly show the present invention.

Referring to FIGS. 1 to 6, there is shown an automatic door operating device 100 which is the first embodiment of the present invention.

Figure 1:
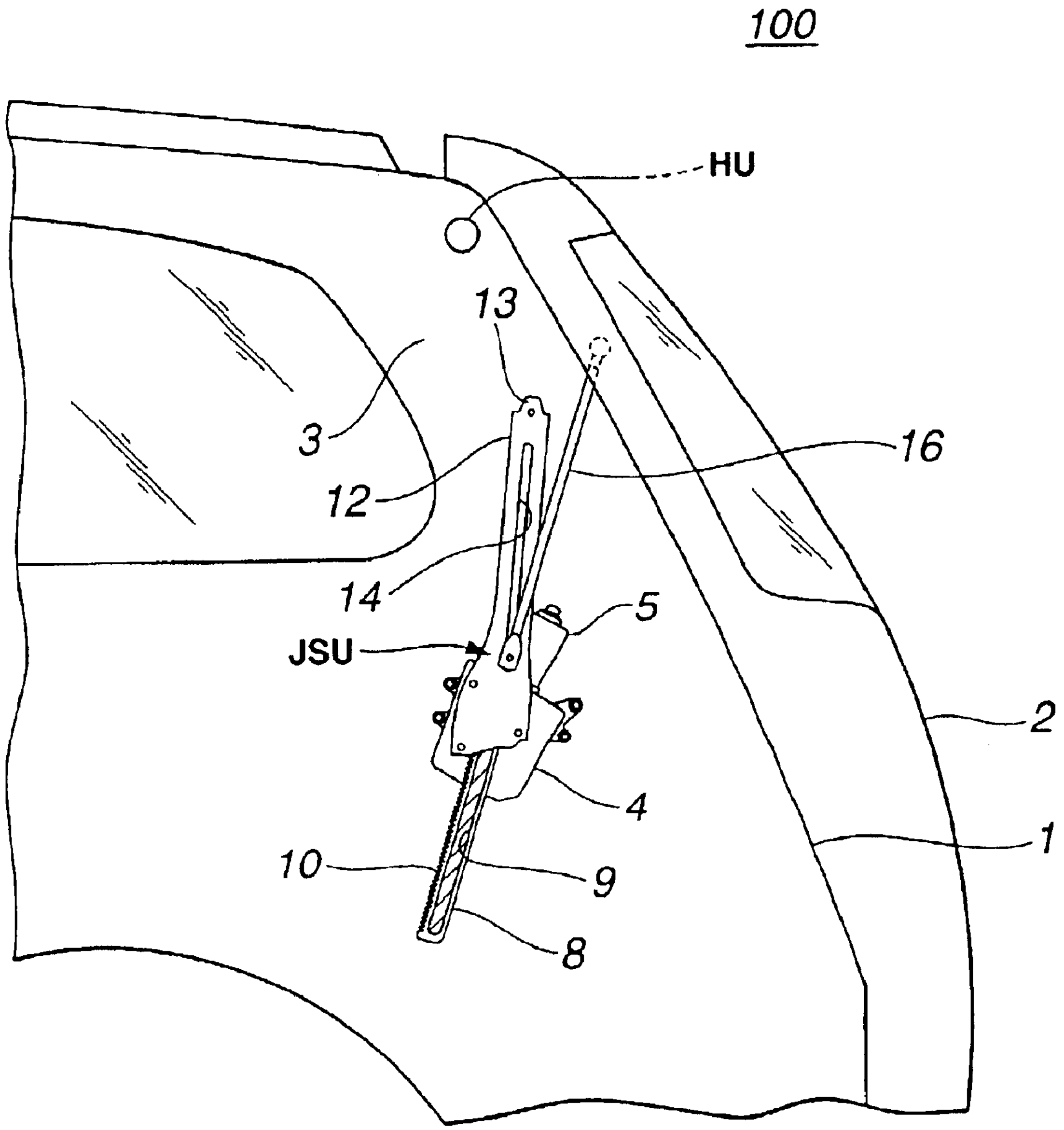
FIG. 1 is a briefly illustrated rear view of a motor vehicle to which an automatic door operating device of a first embodiment of the present invention is practically applied, showing a close condition of the back door.
Figure 2:
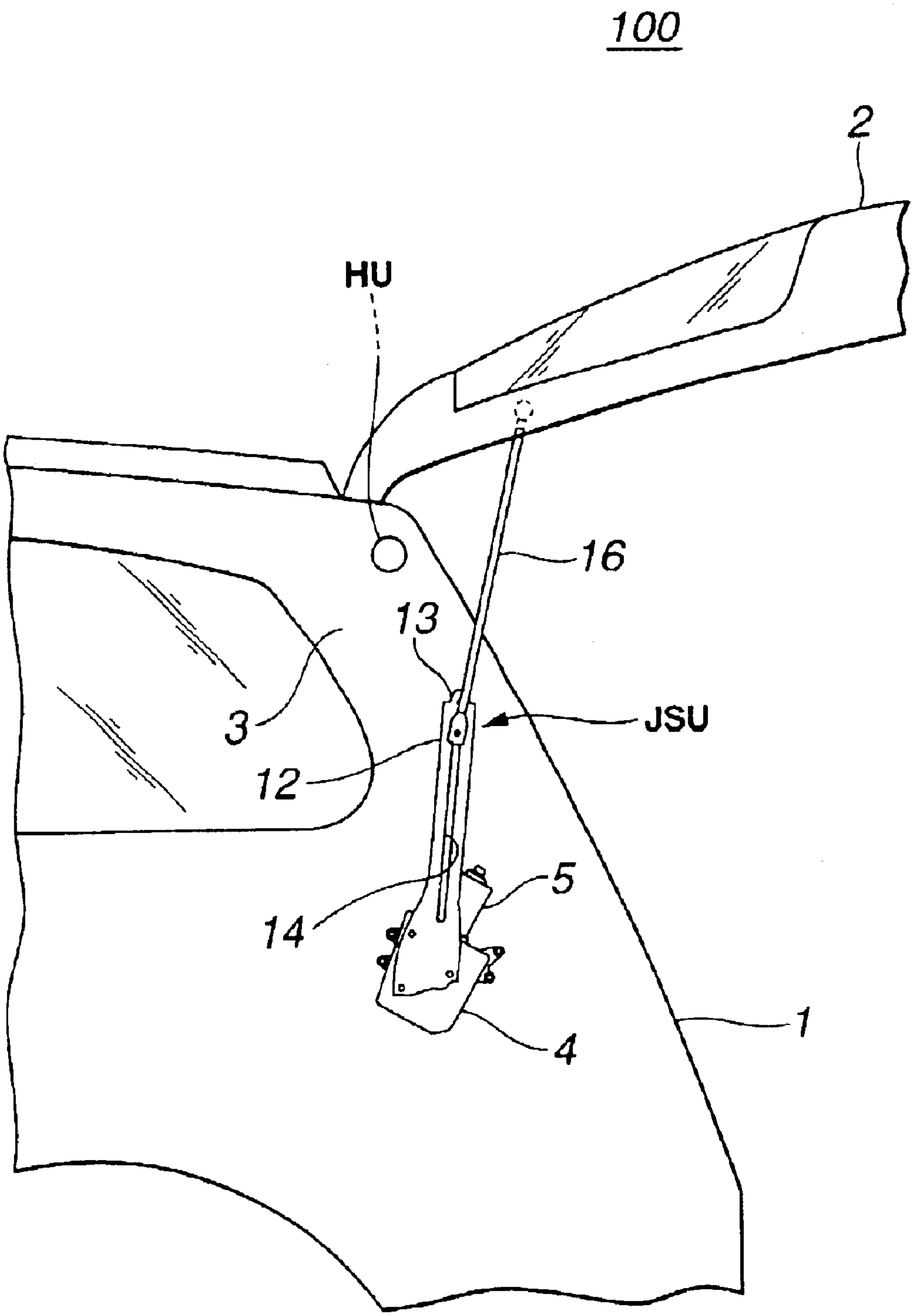
FIG. 2 is a view similar to FIG. 1, but showing an open condition of the back door.

In FIGS. 1 and 2, there is shown a rear part of a wheeled motor vehicle, to which the automatic door operating device 100 of the first embodiment is practically applied.

It is to be noted that the device 100 is mounted for example to a right rear pillar 3 of the vehicle body which is placed at a right side with respect to a passenger sitting in the vehicle with his or her eyes facing forward, and an inner board (not shown) is attached to an inner surface of the right rear part 3 to put therebetween the device 100. Thus, the device 100 is not viewed by the passengers in the vehicle.

As is best seen from FIG. 2, the motor vehicle has a back opening 1 that is equipped with a pivotal back door 2. Laterally opposed upper portions of the back door 2 are pivotally connected to corresponding upper portions of the vehicle body through respective hinge units "HU" which are aligned. Thus, the back door 2 is able to pivot about a common axis of the hinge units "HU" between a full-close position as shown in FIG. 1 and a full-open position as shown in FIG. 2.

The automatic door operating device 100 comprises a drive unit 4 that is mounted on for example the right rear pillar 3 of the vehicle body. The drive unit 4 includes an electric motor 5, a speed reduction gear and a clutch mechanism.

Figure 3:
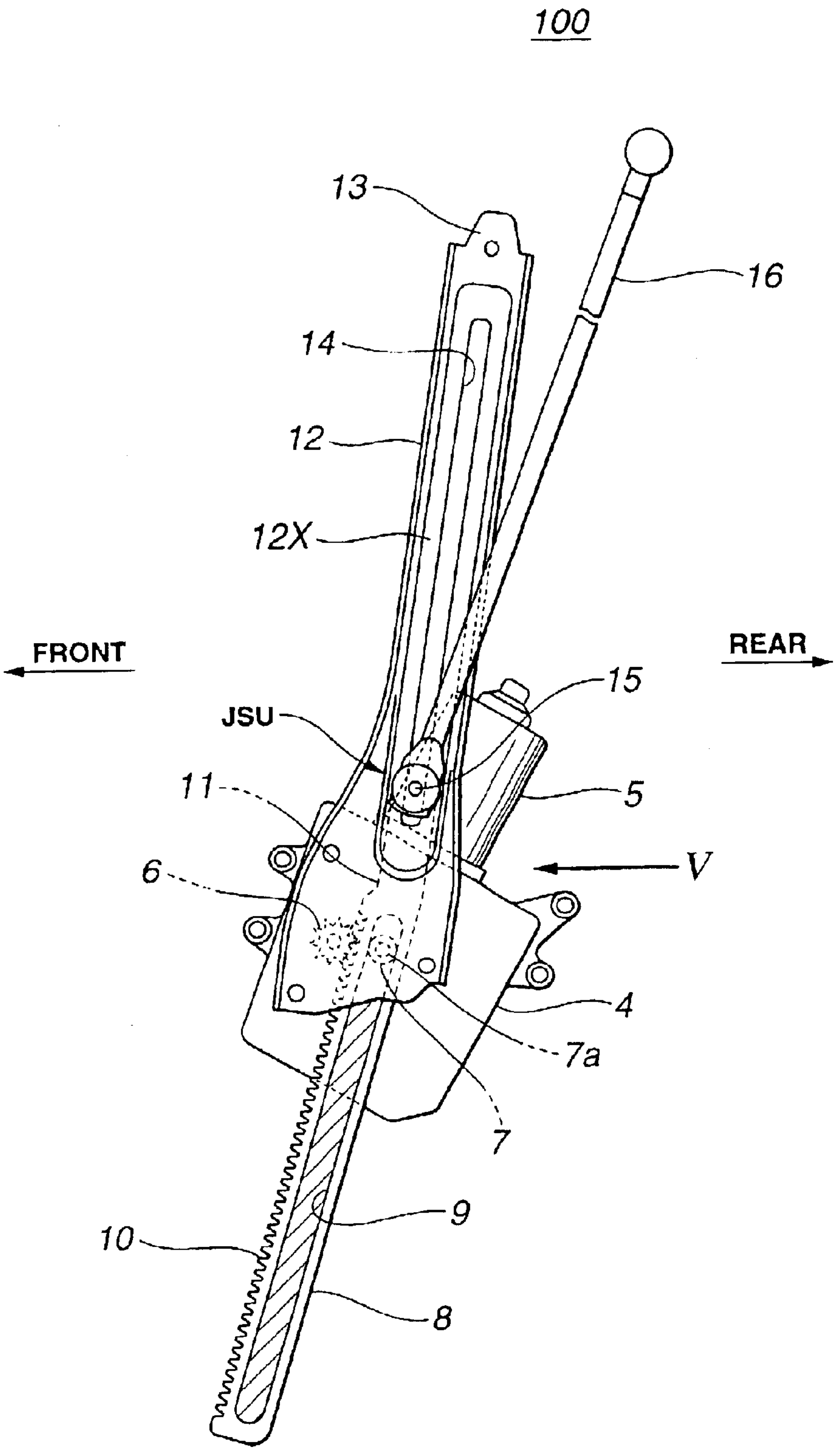
FIG. 3 is an elevation view of the automatic door operating device of the first embodiment.
Figure 4:
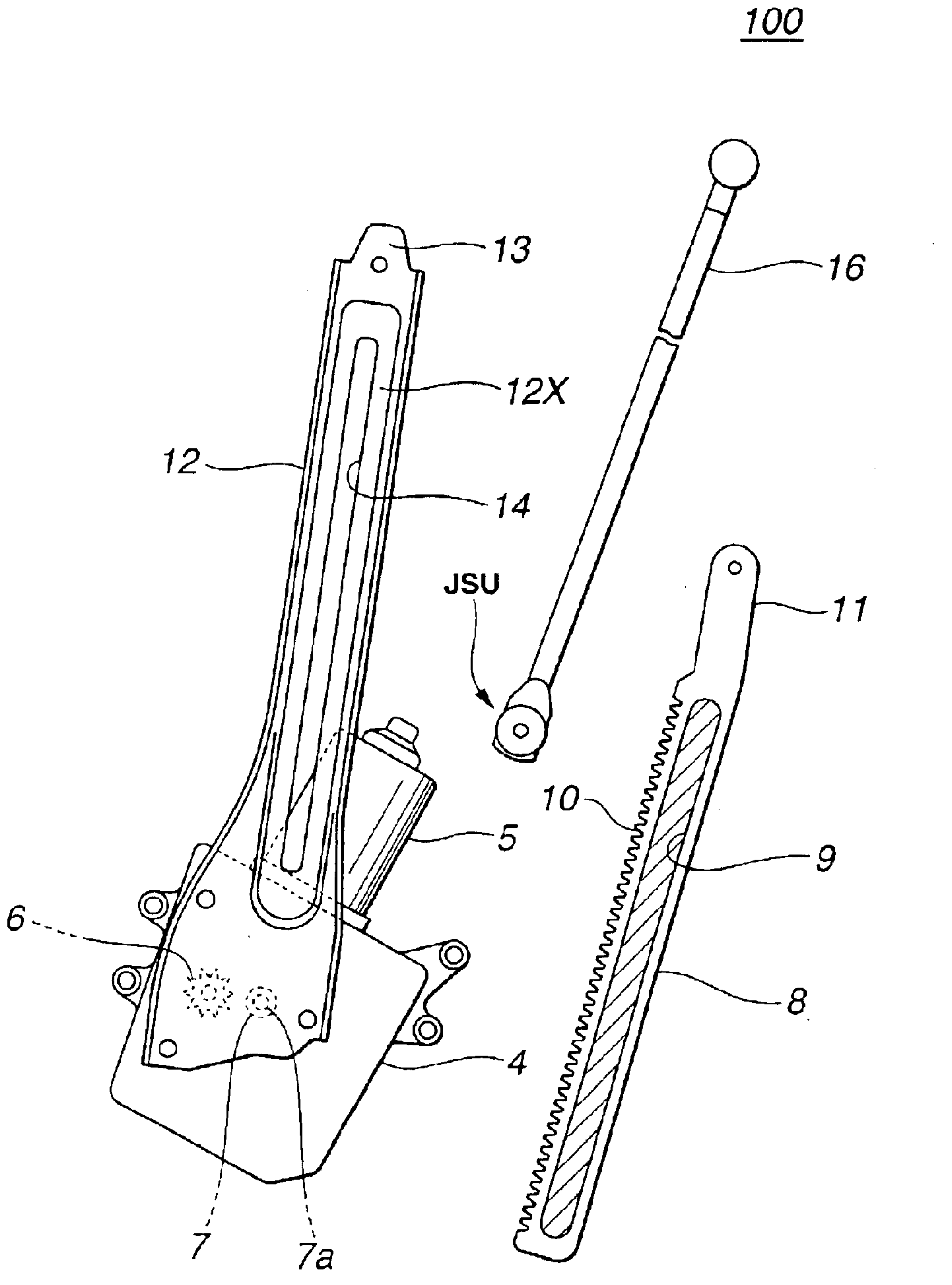
FIG. 4 is an exploded view of the automatic door operating device of the first embodiment.

As shown in FIG. 3, the drive unit 4 has a pinion gear 6 driven by the electric motor 5 through the speed reduction gear and the clutch mechanism. Beside the pinion gear 6, there is arranged a roller bearing 7 that is rotatably held by a pin 7*a* fixed to the drive unit 4. The roller bearing 7 is operatively received in an elongate guide groove 9 formed in a rack bar 8. The rack bar 8 is formed with a rack gear 10 that is meshed with the pinion gear 6. Accordingly, when, due to energization of the electric motor 5, the pinion gear 6 is rotated, the rack bar 8 is moved upward or downward. During the upward or downward movement, the rack bar 8 pivots about a center of the roller bearing 7 (or the pin 7*a*) by a given angle keeping the meshed engagement with the pinion gear 6.

As shown in FIG. 3, a rail member 12 is fixed at an enlarged lower part thereof to the drive unit 4 keeping therebetween a given space to which the pinion gear 6, the roller bearing 7 and an upper part 11 of the rack bar 8 are exposed. An upper part 13 of the rail member 12 is fixed to an inner surface of the right rear pillar 3 (see FIG. 2). The rail member 12 is formed with an elongate guide slot 14 that longitudinally extends from the enlarged lower part of the rail member 12 toward the upper part 13 of the same. The elongate guide slot 14 is surrounded by a groove 12*x* (see FIG. 6) that is provided for reinforcing the rail member 12.

Figure 5:
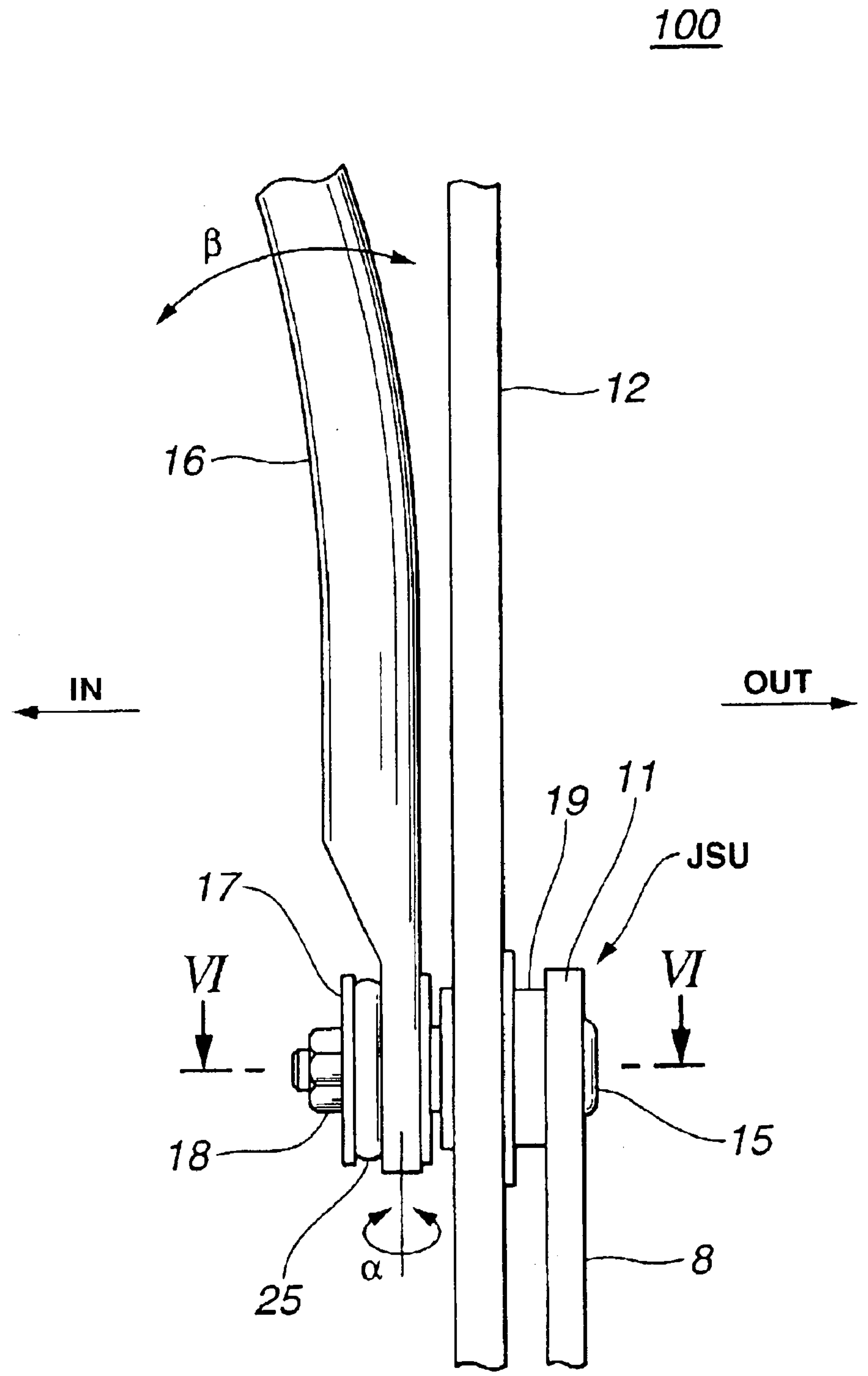
FIG. 5 is an enlarged view taken from a direction of the arrow "V" of FIG. 3.
Figure 6:
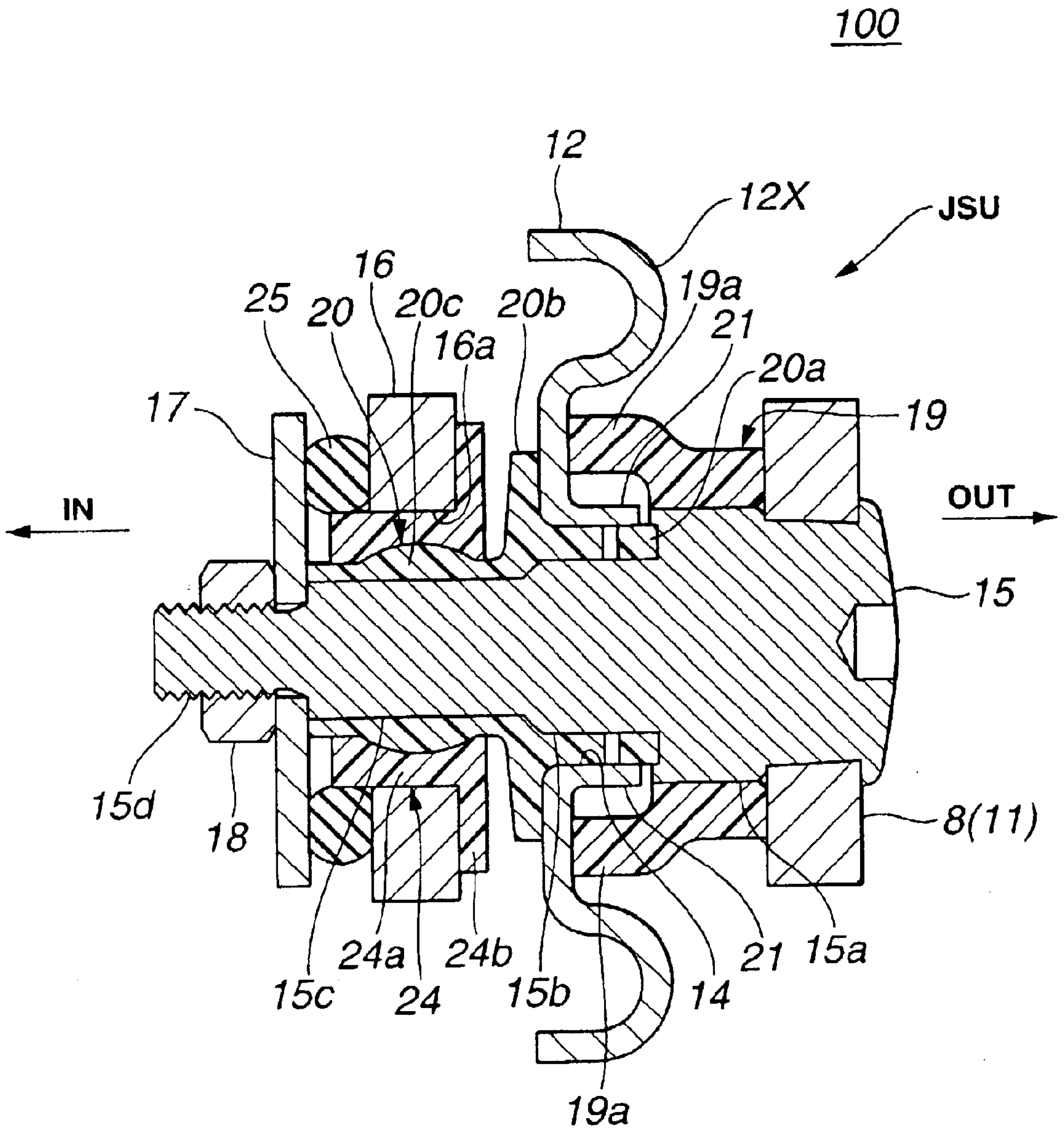
FIG. 6 is an enlarged sectional view taken from a direction of the arrow "VI—VI" of FIG. 5.

As is seen from FIGS. 3, 5 and 6, the upper part 11 of the rack bar 8 is equipped with a bolt member 15 that passes through the elongate guide slot 14 of the rail member 12 and through an opening 16*a* formed in a lower end of a connecting rod 16.

As shown in FIGS. 5 and 6, a nut 18 is engaged with a threaded end portion of the bolt member 15 to press a washer 17 against an O-ring 25 disposed on the bolt member 15.

As is seen from FIG. 2, an upper end of the connecting rod 16 is pivotally connected to an upper portion of the pivotal back door 2.

Thus, as is seen from FIG. 5, the upper part 11 of the rack bar 8 is pivotally connected to the lower end of the connecting rod 16 through the bolt member 15 which slides upward and downward in and along the elongate guide slot 14 of the rail member 12.

That is, the pivotal connection between the rack bar 8 and the connecting rod 16 and the sliding engagement of the bolt member 15 with the elongate guide slot 14 are established by a so-called joint/slider unit "JSU" which will be more clarified from the following description directed to FIG. 6.

In FIG. 6, there is shown the detail of the joint/slider unit "JSU" that allows such pivotal connection and sliding engagement.

As shown, the bolt member 15 comprises first, second, third and fourth cylindrical portions 15*a*, 15*b*, 15*c* and 15*d* which are aligned in order. The diameter of these cylindrical portions 15*a*, 15*b*, 15*c* and 15*d* reduces stepwisely in order, as shown. The first cylindrical portion 15*a* is engaged with the upper end 11 of the rack bar 8 (see FIG. 3), and the fourth cylindrical portion 15*d* constitutes the above-mentioned threaded leading end of the bolt member 15, which passes through the washer 17 to engage with the nut 18.

A first plastic slider 19 is coaxially disposed at its cylindrical base portion on the first cylindrical portion 15*a* of the bolt member 15, which has two arm portions 19*a* each having a leading end contacting an inside surface of the rail member 12. Preferably, the leading end of each arm portion 19*a* has a rectangular cross section to have an enlarged contact area. The rail member 12 has two elongate flanges 21 that are bent at right angles to define therebetween the elongate guide slot 14.

A second plastic slider 20 is concentrically disposed on the second and third cylindrical portions 15*b* and 15*c* of the bolt member 15. The second plastic slider 20 comprises an inside part 20*a*, a circular flange part 20*b* and a bulged part 20*c* which are coaxially aligned. The insider part 20*a* is disposed about the second cylindrical portion 15*b* of the bolt member 15 and has at diametrically opposed portions flat surfaces which slidably contact inner surfaces of the elongate flanges 21 of the rail member 12. The circular flange part 20*b* is positioned to slidably put on an outside surface of the rail member 12 and the bulged part 20*c* is concentrically disposed on the third cylindrical portion 15*c* of the bolt member 15.

Slidably rotatably disposed on the bulged part 20*c* is a plastic rod holder 24 that comprises an annular base part 24*a* that is slidably disposed on the bulged part 20*c* and put in an opening 16*a* formed in the lower end of the connecting rod 16 (see FIG. 3) and a circular flange portion 24*b* that slidably contacts an inside surface of the connecting rod 16.

To establish the slidable contact between the bulged part 20*c* and the annular base part 24*a*, there is arranged a universal joint structure which comprises a convex surface possessed by the bulged part 20*c* and a concave surface possessed by the annular base part 24*a*. The convex surface and the concave surface are intimately slidably engaged with each other to permit a pivoting of the connecting rod 16 relative to the bolt member 15.

The O-ring 25 is constructed of an elastic material and compressed between the washer 17 and an outside surface of the connecting rod 16, as shown.

Due to provision of the O-ring 25 thus compressed, the parts and portions of the joint/slider unit "JSU" that are disposed on the bolt 15 are applied with a certain biasing force thereby suppressing or at least minimizing undesired play of them on the bolt member 15.

Furthermore, as is seen from FIG. 5, due to the same reason, the connecting rod 16 is suppressed from twisting about a longitudinal axis of the same, that is, in the direction of the arrow "$\alpha$". This twisting suppression is important especially when the connecting rod 16 has to have a cranked portion because of a difference in shape of the motor vehicle to which the door operating device 100 is applied.

In the following, operation of the automatic door operating device 100 will be described with the aid of the drawings.

For ease of understanding, the description will be commenced with respect to the full-close condition of the back door 2, as shown in FIG. 1.

Under this condition, the automatic door operating device 100 assumes the condition as shown in FIG. 3. That is, the rack bar 8 assumes its lowermost position and thus the connecting rod 16 assumes its lowermost position.

When now the electric motor 5 of the drive unit 4 is energized to turn in one direction, the pinion gear 6 is turned in one direction to move up the rack bar 8 inducing an upward movement of the connecting rod 16 along the elongate guide slot 14 of the rail member 12. During the upward movement of the connecting rod 16, the back door 2 is gradually raised, and when the back door 2 is lifted to the full-open position as shown in FIG. 2, the electric motor 5 becomes de-energized. For controlling the electric motor 5, a rotary encoder (not shown) is used which counts the number of revolutions of the pinion gear 6. That is, when a given number corresponding to the full-open position of the back door 2 is counted by the rotary encoder, the electric motor 5 is de-energized. Thus, thereafter, the back door 2 keeps the full-open position. In fact, a gas filled stay (not shown) is provided which extends between the vehicle body and the back door 2 for assisting the back door 2 to keep the full-open position.

When now the electric motor 5 is re-energized to turn in the other direction, the pinion gear 6 is turned in the other direction to move down the rack bar 8 inducing a downward movement of the connecting rod 16 along the elongate guide slot 14 of the rail member 12. During such downward movement of the connecting rod 16, the back door 2 is gradually lowered, and when the back door 2 comes to the full-close position as shown in FIG. 1, the electric motor 5 is de-energized.

As is seen from FIG. 6, during the above-mentioned open/close pivoting movement of the back door 2, the joint/slider unit "JSU" is forced to run upward or downward in and along the elongate guide slot 14 of the rail member 12. During this movement of the joint/slider unit "JSU", the first and second plastic sliders 19 and 20 mounted on the bolt member 15 slide on the opposed surfaces of the rail member 12 and the inner surfaces of the elongate flanges 21 of the rail member 12. More specifically, the two arms 19*a* of the first slider 19 slide on the inside surface of the rail member 12, the circular flange part 20*b* of the second slider 20 slide on the outside surface of the rail member 12 and the flat surfaces of the inside part 20*a* of the second slider 20 slide on the inner surfaces of the elongate flanges 21 of the rail member 12.

As is understood from the drawing (viz., FIG. 6), the first and second sliders 19 and 20 are arranged and constructed to support the joint/slider unit "JSU" (more specifically, the bolt member 15) on the rail member 12 through six major contacting parts, which permits a smoothed and assured guided movement of the joint/slider unit "JSU" in and along the elongate guide slot 14 of the rail member 12.

As is seen from FIG. 5, during the above-mentioned open/close pivoting movement of the back door 2, the connecting rod 16 is forced to pivot inevitably in outward and inward directions about the bolt member 15, that is, in the direction of the arrow "$\beta$" against a counterforce produced by the O-ring 25. However, as is easily understood from FIG. 6, such pivoting movement of the connecting rod 16 is absorbed by the universal joint structure which includes the convex bulged part 20*c* of the second slider 20 and the concave rod holder 24. In other words, such pivoting movement of the connecting rod 16 produces no obstruction against the open/close pivoting movement of the back door 2. Due to the compressed condition of the O-ring 25 of elastic material, such pivoting movement of the connecting rod 16 is carried out without producing a play of the universal joint structure.

As is seen from FIGS. 5 and 6, in the joint/slider unit "JSU", the lower end of the connecting rod 16 and the upper end 11 of the rack bar 8 are connected through the bolt member 15 that passes through the elongate guide slot 14 of the rail member 12. Thus, even when an abnormally big force is applied to the lower end of the connecting rod 16 from the back door 2, undesired "out of joint" movement of the joint/slider unit "JSU", that is, disengagement of the connecting rod 16 from the rail member 12 and thus from the rack bar 8 is prevented. As is seen from FIG. 6, because of the inside part 20*a* of the second slider 20 that is intimately received between each elongate flange 21 of the rail member 12 and the bolt member 15, the load applied to the lower end of the connecting rod 16 is smoothly transmitted to the rail member 12, and thus, the pivotal connection between the connecting rod 16 and the rack bar 8 is much assured.

If desired, the device 100 of the first embodiment may employ the following modifications.

Although the above description is directed to an example wherein the lower portion of the rail member 12 is connected to the drive unit 4, the rail member 12 may be entirely connected to the right rear pillar 3.

Furthermore, if desired, another door operating device that is substantially the same as the device 100 may be mounted to a left rear pillar (3) for operating the back door 2.

Referring to FIGS. 7 to 11B, there is shown an automatic door operating device 200 which is the second embodiment of the present invention.

Since the device 200 of the second embodiment is similar in construction to the above-mentioned device 100 of the first embodiment, only parts and portions which are different from those of the first embodiment 100 will be described in the following. The substantially same parts and portions as those of the first embodiment are denoted by the same numerals, and different but corresponding parts and portions to those of the first embodiment are denoted by the same numerals with the addition of a dash "'".

The device 200 of the second embodiment is constructed to be applicable to a limited space where an obstacle "OB", such as a speaker or the like, is to be positioned just below the drive unit 4 of the device 200. That is, in the second embodiment, a measure is practically used for causing the rack bar 8' to take a certain path that avoids the obstacle "OB".

Figure 10:
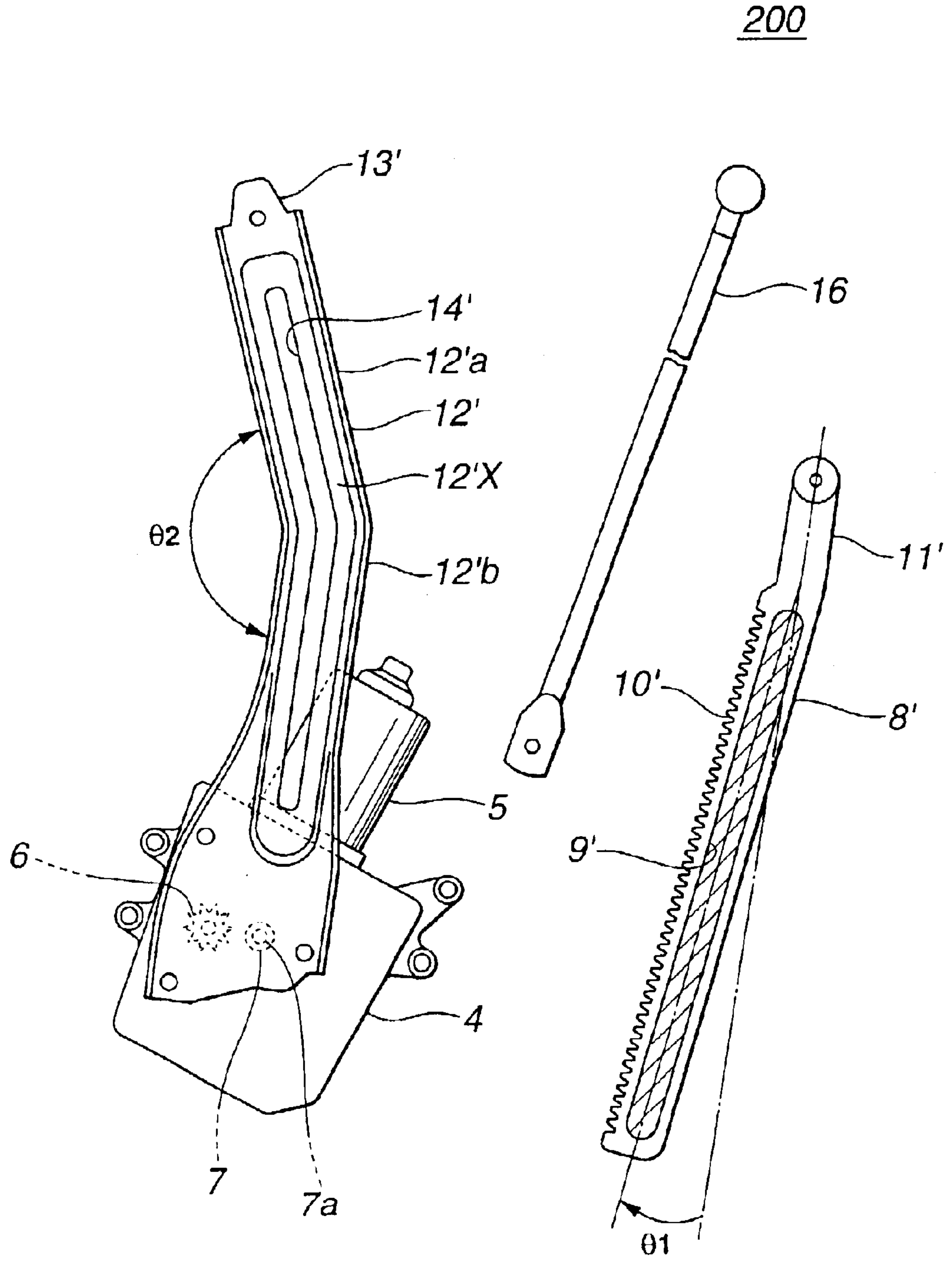
FIG. 10 is an exploded view of the automatic door operating device of the second embodiment.
Figure 11A:
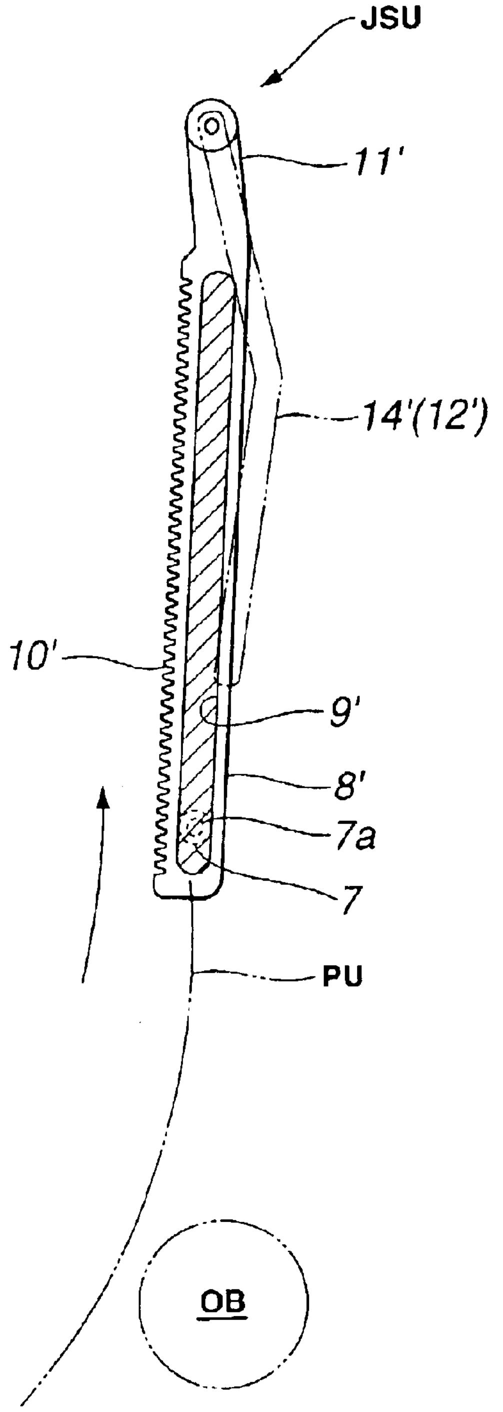
FIGS. 11A and 11B are views showing the paths of a rack bar in the device of the second embodiment that are respectively described when the rack bar is moved upward and downward.
Figure 11B:
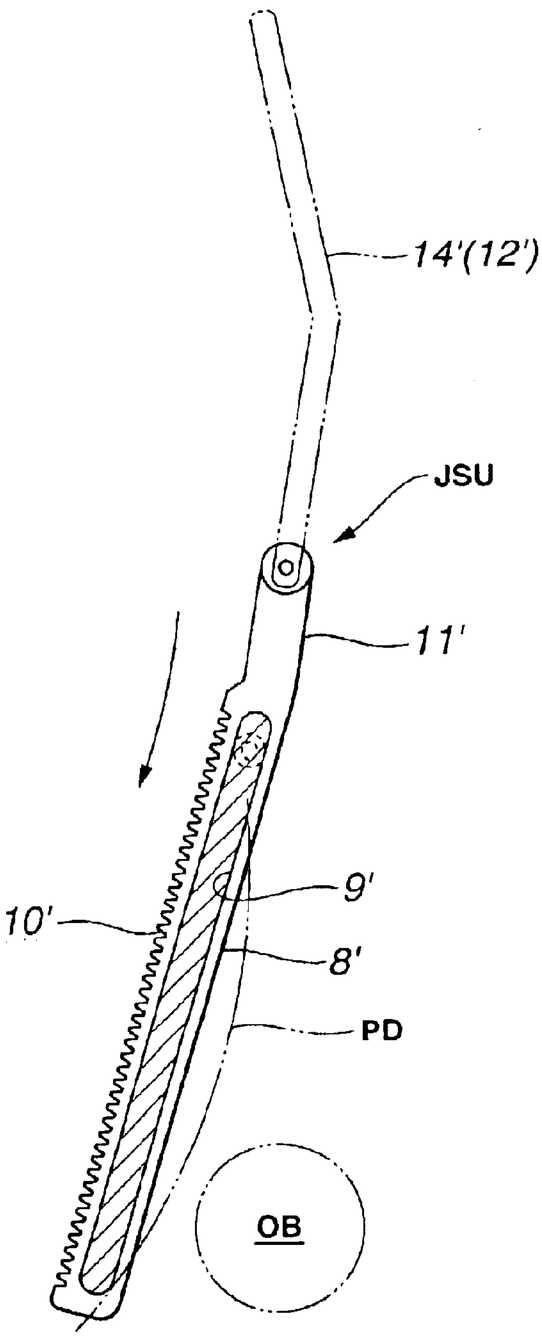

As is seen from FIG. 10, the rack bar 8' has an upper part 11' that is bent relative to a major lower part of the rack bar 8' by an angle "θ1". In the illustrated embodiment, the upper part 11' is bent forward with respect to the right rear pillar 3 (see FIG. 7) of the vehicle body.

Furthermore, as is seen from FIG. 10, the rail member 12' has an upper-half portion 12'*a* that is bent forward by an angle "θ2" relative to a lower-half portion 12'*b* of the rail member 12'. Thus, the guide slot 14' has a corresponding bent shape, as shown.

Operation of the automatic door operating device 200 of the second embodiment will be described with the aid of the drawings.

Figure 7:
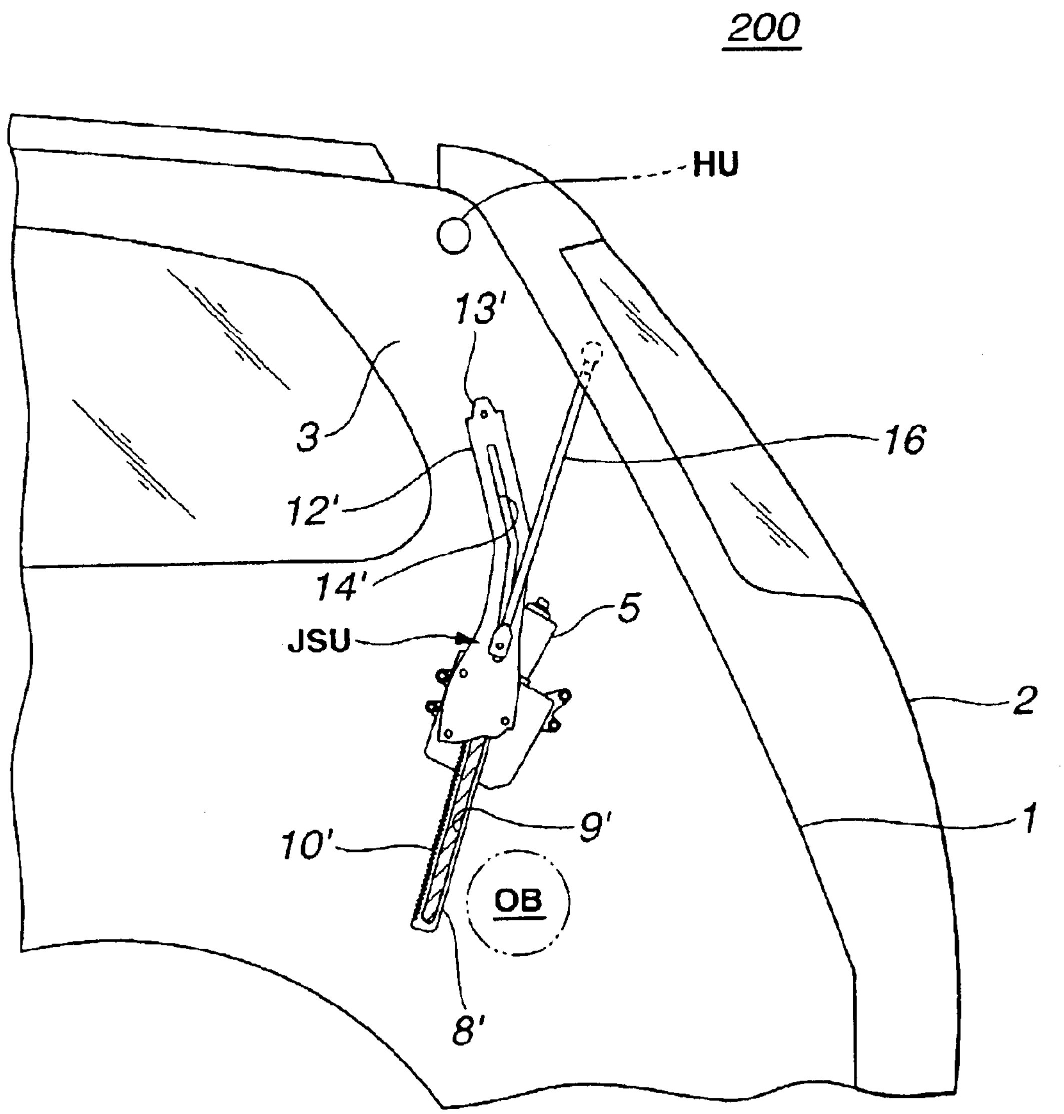
FIG. 7 is a view similar to FIG. 1, but showing an automatic door operating device of a second embodiment of the present invention.

FIG.7 shows a full-close condition of the back door 2. Under this condition, the rack bar 8' assumes its lowermost position avoiding the obstacle "OB". It is to be noted that due to the above-mentioned bent shape of the rack bar 8' and rail member 12', avoiding the obstacle "OB" by the rack bar 8' is readily made.

Figure 8:
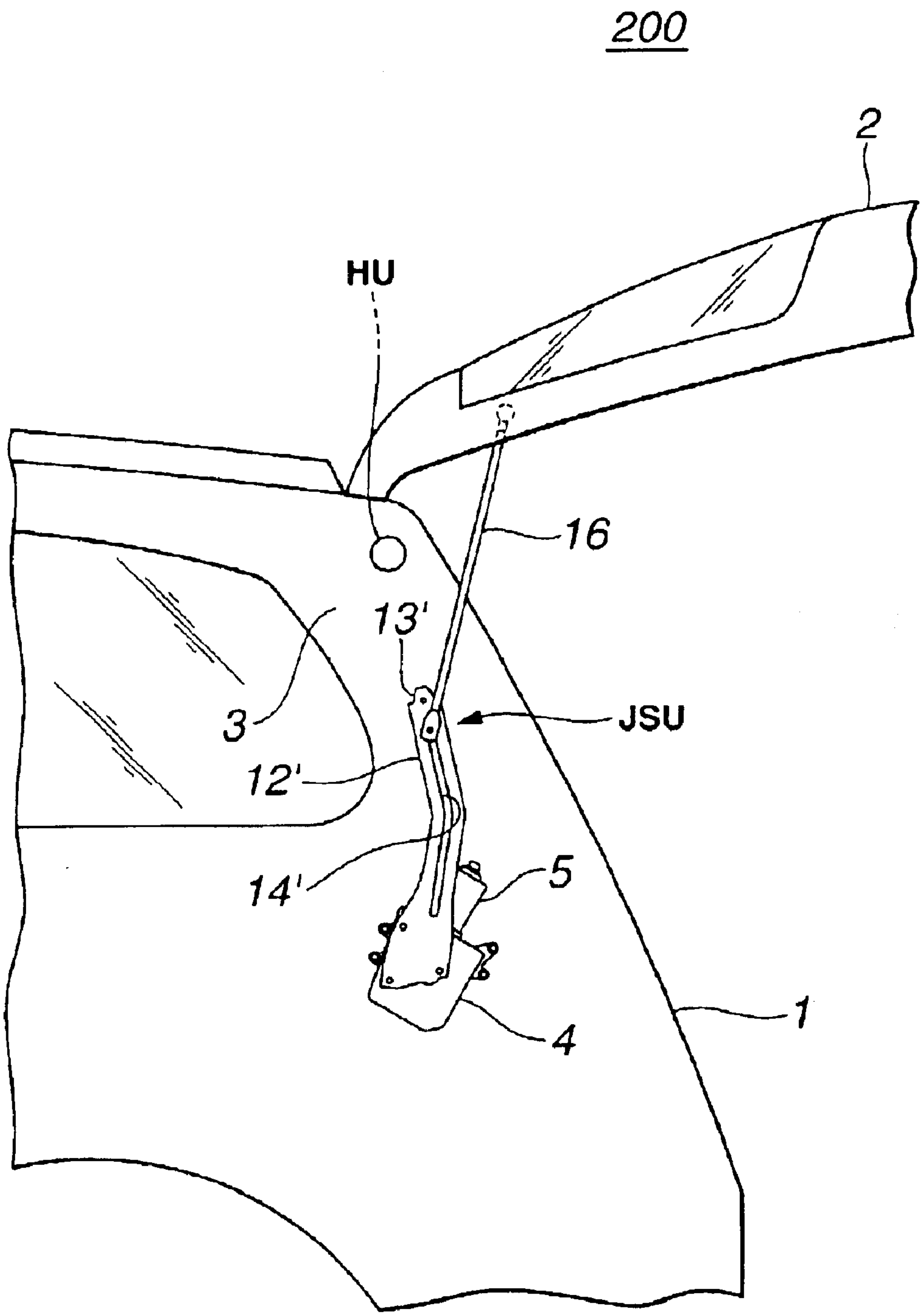
FIG. 8 is a view similar to FIG. 7, but showing an open condition of the back door.
Figure 9:
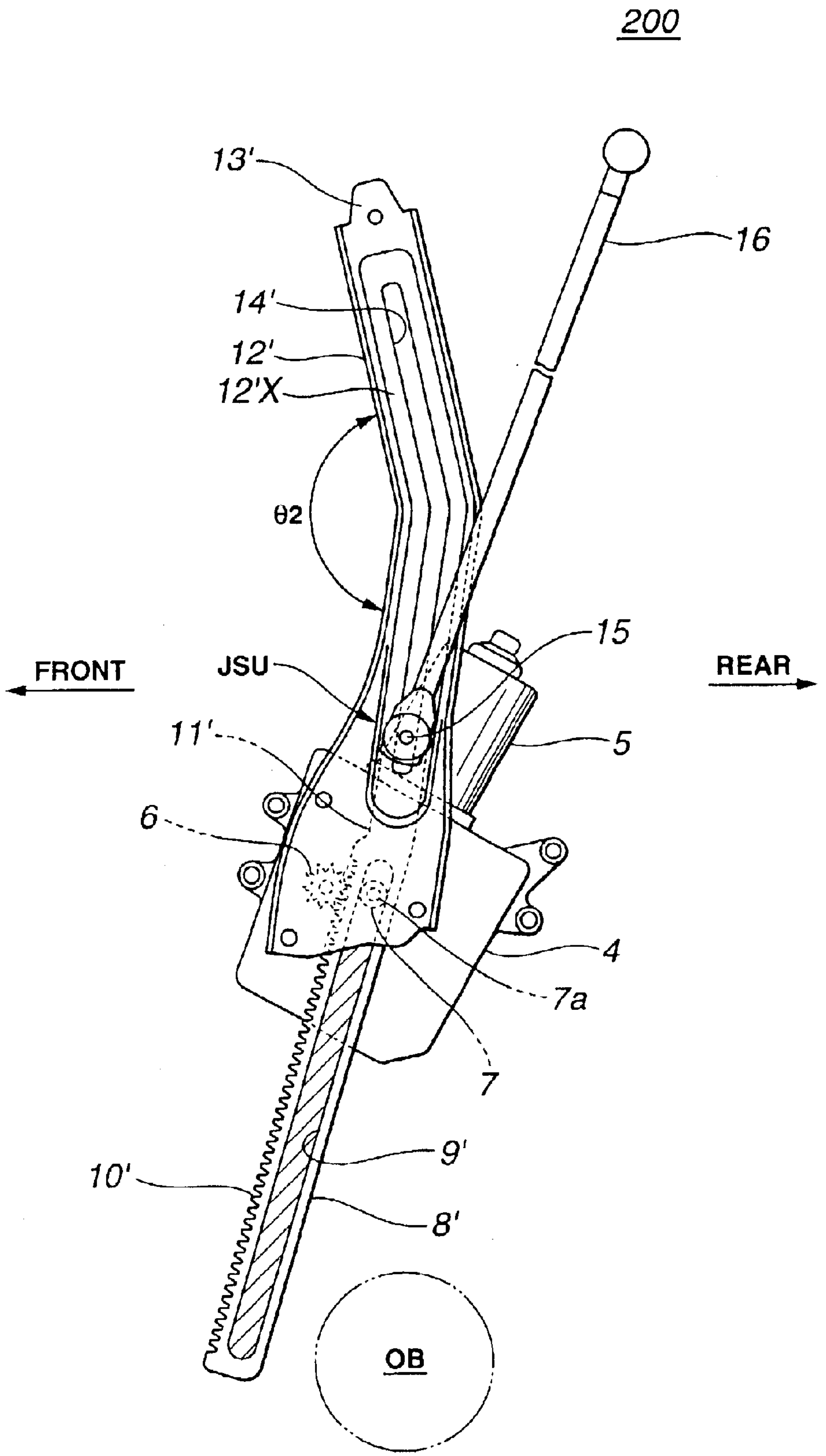
FIG. 9 is an elevation view of the automatic door operating device of the second embodiment.

When now the electric motor 5 of the drive unit 4 is energized to turn in one direction, the pinion gear 6 (see FIG. 9) is turned in one direction to move up the rack bar 8' inducing an upward movement of the connecting rod 16 along the guide slot 14' of the rail member 12'. During the upward movement of the connecting rod 16, the back door 2 is gradually raised, and when the back door 2 is lifted to the full-open position as shown in FIG. 8, the electric motor 5 is de-energized.

It is to be noted that during this upward movement of the back door 2, the rack bar 8' is prevented from interfering with the obstacle "OB" due to the unique bent shape of the rack bar 8' and rail member 12'. This desired upward movement of the rack bar 8' will be much clarified when referring to FIG. 11A that shows a path "PU" of the rack bar 8' provided when the back door 2 is moved upward.

When now the electric motor 5 is re-energized to turn in the other direction, the pinion gear 6 is turned in the other direction to move down the rack bar 8' inducing a downward movement of the connecting rod 16 along the guide slot 14' of the rail member 12'. During such downward movement of the connecting rod 16, the back door 2 is gradually lowered, and when the back door 2 comes to the full-close position as shown in FIG. 7, the electric motor 5 becomes de-energized.

It is to be noted that during this downward movement of the back door 2, the rack bar 8' is prevented from interfering with the obstacle "OB". This desired downward movement of the rack bar 8' will be much clarified when referring to FIG. 11B that shows a path "PD" of the rack bar 8' provided when the back door 2 is moved downward.

If desired, the device 200 of the second embodiment may employ the following modifications.

Although the above description is directed to an example wherein the rack bar 8' and the rail member 12' have each one bent portion, these parts 8' and 12' may have each two and more bent portions. Furthermore, each of these parts 8' and 12' may be entirely curved.

Furthermore, if desired, another door operating device that is substantially the same as the device 200 may be mounted to a left rear pillar (3) for operating the back door 2.

The entire contents of Japanese Patent Applications 2002-117561 filed Apr. 19, 2002 and 2002-118366 filed Apr. 19, 2002 are pertinent and should be noted.

Although the invention has been described above with reference to the embodiments of the invention, the invention is not limited to such embodiments as described above. Various modifications and variations of such embodiments may be carried out by those skilled in the art, in light of the above description.

What is claimed is:

1. An automatic door operating device for a motor vehicle that has a door pivotally connected to a body of the vehicle, comprising:

- a drive unit mounted to the vehicle body and including an electric motor and a pinion gear driven by the electric motor;
- a rack bar meshed with the pinion gear;
- a rail member mounted to the vehicle body, the rail member having a longitudinally extending guide slot formed therethrough;
- a connecting rod having one end pivotally connected to the door; and
- a joint/slider unit that pivotally connects an end of the rack bar to the other end of the connecting rod while being slid in and along the guide slot of the rail member, wherein the joint/slider unit includes:

- a bolt member passing through the guide slot and including first and second sections which are respectively projected into one and the other sides with respect to the rail member, the first section being held by the end of the rack bar and the second section being pivotally held by the other end of the connecting rod;
- a first slider disposed on the first section of the bolt member and slidably contacting one surface of the rail member;

a second slider disposed on the second section of the bolt member and slidably contacting the other surface of the rail member; and a universal joint structure disposed between the second slider and the other end of the connecting rod to permit a pivoting of the connecting rod relative to the bolt member.

2. An automatic door operating device as claimed in claim 1, in which the universal joint structure comprises:

a rod holder disposed in an opening formed in the other end of the connecting rod;

a concave portion possessed by the rod holder; and a convex portion possessed by the second slider and intimately and slidably engaged with the concave portion.

3. An automatic door operating device as claimed in claim 2, in which the rail member is formed with elongate flanges that are bent in the same direction to define therebetween the guide slot, and in which the second slider is formed at diametrically opposed portions thereof with flat surfaces which slidably contact inner surfaces of the elongate flanges of the rail member.

4. An automatic door operating device as claimed in claim 1, in which the joint/slider unit further comprises:

a washer disposed on the second section of the bolt member;

an O-ring constructed of an elastic material and disposed between the washer and the universal joint structure; and a nut engaged with a threaded leading end of the bolt member to compress the O-ring between the washer and the universal joint structure.

5. An automatic door operating device as claimed in claim 1, in which the first and second sliders are constructed of a plastic.

6. An automatic door operating device as claimed in claim 3, in which the first slider comprises:

an annular base portion concentrically disposed about the first section of the bolt member; and two arm portions which straddle the elongate flanges of the rail member and have leading ends contacting the surface of the rail member.

7. An automatic door operating device as claimed in claim 6, in which the second slider comprises:

an inside part having the flat surfaces which slidably contact the inner surfaces of the elongate flanges of the rail member;

a circular flange part that slidably contacts the other surface of the rail member; and a bulged part that is concentrically disposed on the second section of the bolt member, the bulged part having the convex portion formed thereon.

8. An automatic door operating device as claimed in claim 1, further comprising:

an elongate guide groove formed in and along the rack bar; and a guide member connected to the drive unit and slidably engaged with the elongate guide groove to guide the movement of the rack bar.

9. An automatic door operating device as claimed in claim 1, in which the rail member is bent by a given angle at a generally middle portion thereof.

10. An automatic door operating device as claimed in claim 9, in which the end of the rack bar by which the bolt member is held is angled by a given degree relative to a major portion of the rack bar.

11. An automatic door operating device for a motor vehicle that has a door pivotally connected to a body of the vehicle, comprising:

a drive unit mounted to the vehicle body and including an electric motor and a pinion gear driven by the electric motor;

a rack bar meshed with the pinion gear and having upper and lower ends;

a rail member mounted to the vehicle body, the rail member having a longitudinally extending guide slot formed therethrough and elongate flanges between which the guide slot is defined;

a connecting rod having an upper end pivotally connected to the door;

a bolt member passing through the guide slot of the rail member and including first and second sections which are respectively projected into one and the other sides with respect to the rail member, the first section being held by the upper end of the rack bar and the second section being pivotally held by a lower end of the connecting rod;

a first slider disposed on the first section of the bolt member and slidably contacting one surface of the rail member;

a second slider disposed on the second section of the bolt member and slidably contacting the other surface of the rail member and inner surfaces of the elongate flanges of the rail member;

a rod holder disposed in an opening formed in the lower end of the connecting rod;

a concave portion possessed by the rod holder; and a convex portion possessed by the second slider and intimately and slidably engaged with the concave portion.

* * * * *